July 22, 1924.

H. E. PATRICK ET AL

1,502,349

APPARATUS FOR USE IN ASSEMBLING, REPAIRING, AND LIMBERING GAS
ENGINES OF VARIOUS TYPES

Filed March 5, 1919

July 22, 1924.　　　　　　　　　　　　　　　　　1,502,349
H. E. PATRICK ET AL
APPARATUS FOR USE IN ASSEMBLING, REPAIRING, AND LIMBERING GAS
ENGINES OF VARIOUS TYPES
Filed March 5, 1919　　　　　8 Sheets-Sheet 5

July 22, 1924.  1,502,349
H. E. PATRICK ET AL
APPARATUS FOR USE IN ASSEMBLING, REPAIRING, AND LIMBERING GAS
ENGINES OF VARIOUS TYPES
Filed March 5, 1919  8 Sheets-Sheet 8

Patented July 22, 1924.

1,502,349

UNITED STATES PATENT OFFICE.

HARRY E. PATRICK, OF EVANSTON, AND ANDREW J. PETERSON AND JOHN W. BERMES, OF CHICAGO, ILLINOIS, ASSIGNORS, BY MESNE ASSIGNMENTS, TO DEARBORN EQUIPMENT COMPANY, OF KALAMAZOO, MICHIGAN, A CORPORATION OF MICHIGAN.

APPARATUS FOR USE IN ASSEMBLING, REPAIRING, AND LIMBERING GAS ENGINES OF VARIOUS TYPES.

Application filed March 5, 1919. Serial No. 280,740.

*To all whom it may concern:*

Be it known that we, HARRY E. PATRICK, ANDREW J. PETERSON, and JOHN W. BERMES, citizens of the United States, residing at Evanston and Chicago, respectively, in the county of Cook and State of Illinois, have invented certain new and useful Improvements in Apparatus for Use in Assembling, Repairing, and Limbering Gas Engines of Various Types, of which the following is a specification.

Our invention relates to a combination machine adapted to be used in connection with the repair, assembling and limbering of internal combustion engines. The primary object of the invention is to provide a machine of the above character in which the supporting structure of the operating mechanism may be readily and conveniently equipped with engine supporting devices and connecting elements, so that the said operating mechanism may be expeditiously employed in the performance of the several operations incident to the repair, assembling or limbering of internal combustion engines of various types.

In order to make extensive repairs on different types of engines, prior to our invention, it was necessary for the automobile service station or repair shop to be equipped with separate machines for performing the several operations and in most cases require specially constructed machines for each type of engine repaired or constructed. This condition required a large expenditure for shop equipment and as a result, of this disadvantage, many proprietors of service stations and repair shops confined their repair work to certain types of engines. It is, therefore, contemplated as one of the objects of our invention to overcome the above disadvantages by providing a simple, compact and inexpensive structure which will perform the several operations necessary when making extensive repairs on engines and which, due to its compactness in structure and adaptability to the constructions of different types of engines, is particularly suitable for use in automobile service stations and repair shops.

The invention consists in the novel arrangements, constructions and combinations of parts and devices hereinafter described and claimed for carrying out the above stated objects and such other objects as may appear from the following description.

We have illustrated our invention in connection with two types of Ford engines. One type being used in connection with tractors and the other type being used in connection with the Ford automobile. It will be obvious from the specification that the invention may be used in connection with the repairing or assembling of any type of internal combustion engine.

The invention is illustrated in the accompanying drawings, wherein.

Like characters of reference designate like parts in the several figures of the drawings.

Figure 1:
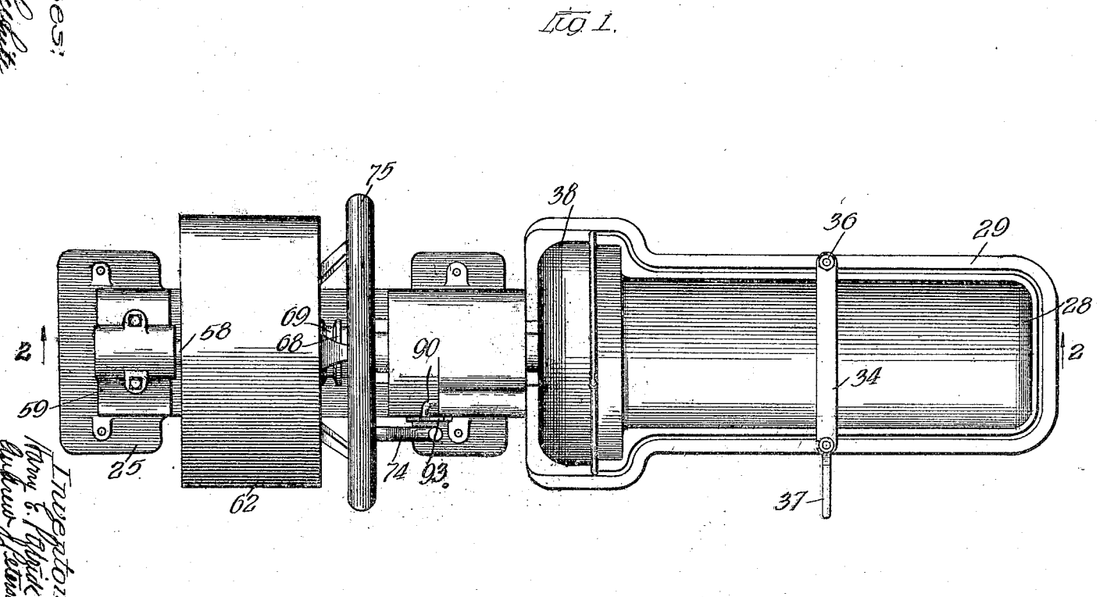
Fig. 1 is a plan view in elevation of our improved combination machine fitted with a supporting stand suitable for supporting a Ford tractor engine.
Figure 2:
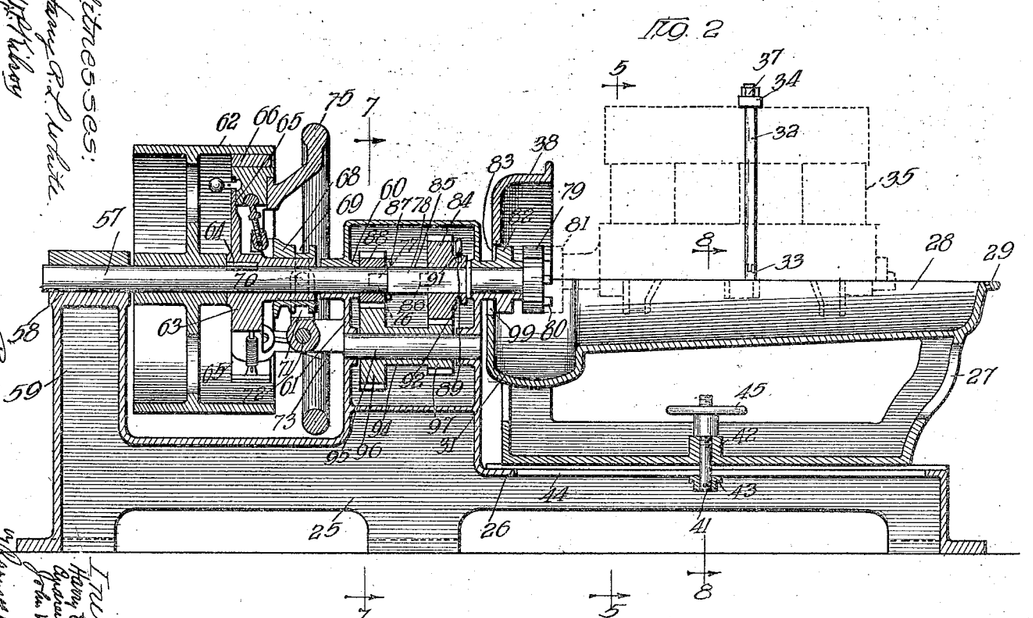
Fig. 2 is a longitudinal vertical section taken on line 2—2 of Fig. 1.
Figure 3:
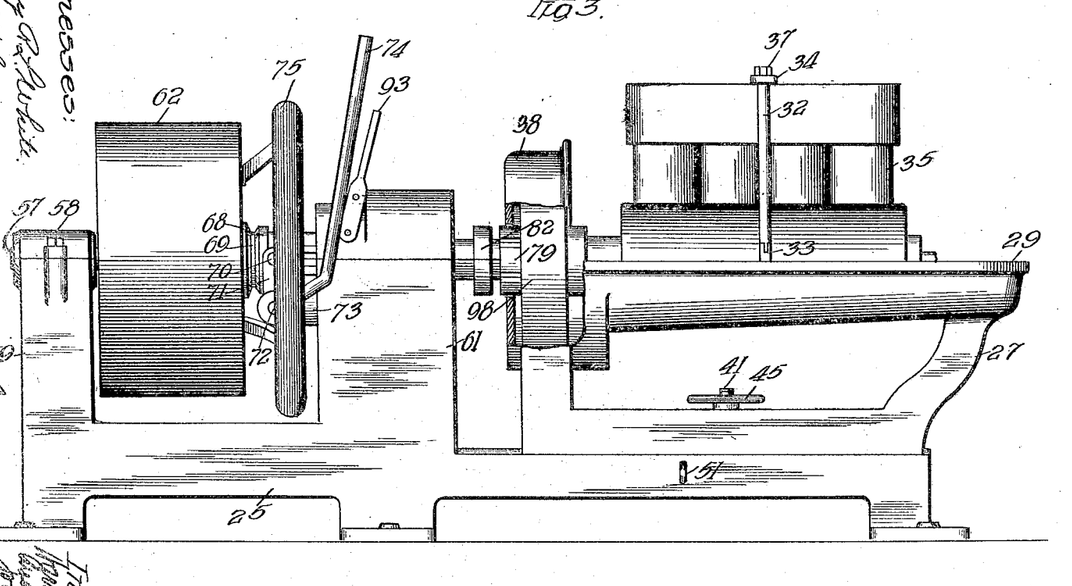
Fig. 3 is a side view in elevation of the structure shown in Figs. 1 and 2 with the engine supporting stand in the position occupied during the limbering operation.
Figure 4:
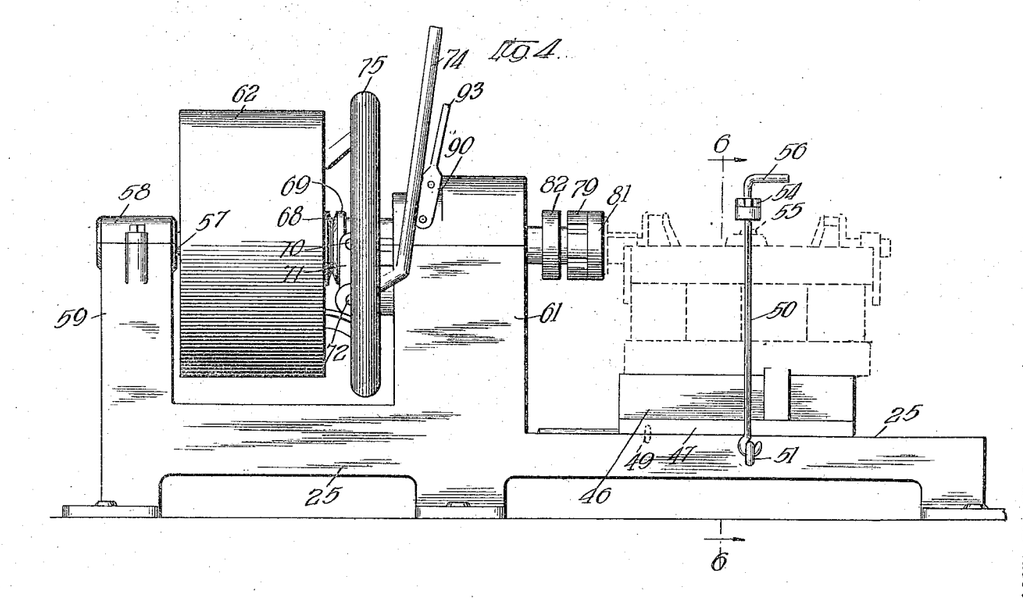
Fig. 4 is a side view in elevation of the base and operating mechanism shown in the preceding figures and illustrating an engine supported in inverted position for the purpose of burning in the bearings or other movable devices.
Figure 5:
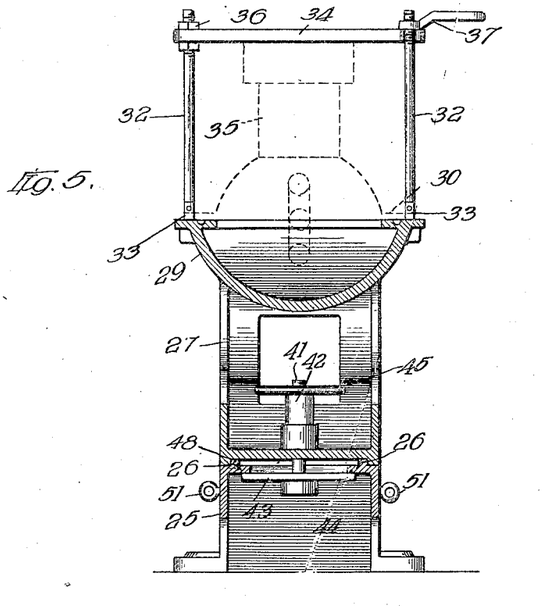
Fig. 5 is a cross section taken on line 5—5 of Fig. 2.

When internal combustion engines are constructed or have been repaired by rebabbitting the crank shaft bearings, the bearings are usually much too tight to permit the engine to be operated under its own power. In order to relieve the binding of these bearings they are burned in by rotating the crank shaft at a relatively low speed before the said bearings have been lubricated. This operation may be performed in connection with our apparatus while the engine is in the upright position, as shown in Fig. 2, or while it is in an inverted position as shown in Fig. 4. After the burning in operation has been performed the engine is preferably completely assembled and is operated at a higher rate of speed to limber the bearings and such other connections of the operative parts that may be tight. This operation may be conveniently performed by securing the assembled engine on the supporting stand in the position shown in Figs. 3 or 9, and connecting the crank shaft with the operating mechanism. If the engine is of the tractor type it is preferably secured to the supporting device shown in Fig. 3 with the lower section of the crank case removed. A sufficient quantity of lubricant is then introduced into the recess of the supporting stand so as to lubricate the bearings while the engine is being operated. In certain other types of engines, the entire engine may be supported on a removable stand, such as that shown in Fig. 9, and connected with the operating mechanism so as to assist the engine in operating under its own power.

The apparatus consists of a base 25 provided with a flat table portion 26 adapted to support an engine supporting stand 27 which consists, as shown, in Figs. 1, 2, 3, 5 and 8, of a recessed portion 28 having flanges 29 to which the flange 30 of the upper section of the crank case of the engine may be bolted or otherwise suitably secured. The recess preferably inclines downwardly to an enlarged portion 31 which is adapted to receive the balance wheel of the engine and to contain the lubricant while the engine is being subjected to the limbering action previously referred to. In the drawings we have illustrated a suitable means for securing the engine to the supporting stand which consists, preferably, of rods 32—32 which are pivoted to studs 33—33 on opposite sides of the recess as indicated at 28 and carry at their upper end a bar 34 which may be clamped down against the top of the engine block 35 by means of nuts 36—37. The inner end of the stand 27 is provided with a housing 38 adapted to fit over the upper portion of the balance wheel of the engine and is preferably detachably secured to the stand by means of pivoted screw clamps 39 which fit between lugs 40 on the housing. The stand 27 is preferably clamped to the table portion 26 of the base with capacity for longitudinal adjustment by means of a bolt 41 which extends through a boss on the bottom 42 of the stand and is provided at its lower end with a bar 43, which engages the under surface of the flanges 44 of the table 26. A hand wheel 45, is threaded onto the upper end of the bolt and is adapted to be secured down against the said boss so as to firmly clamp the stand in position.

Figure 6:
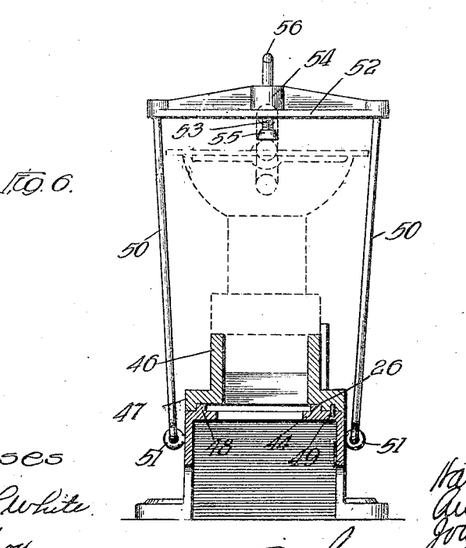
Fig. 6 is a cross section taken on line 6—6 of Fig. 4 looking in the direction indicated by the arrows.
Figure 7:
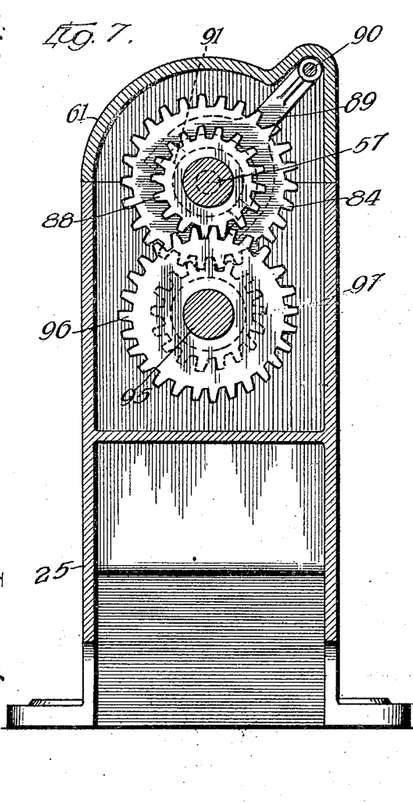
Fig. 7 is a cross section taken on line 7—7 of Fig. 2 illustrating, on a larger scale, the speed changing mechanism.
Figure 8:
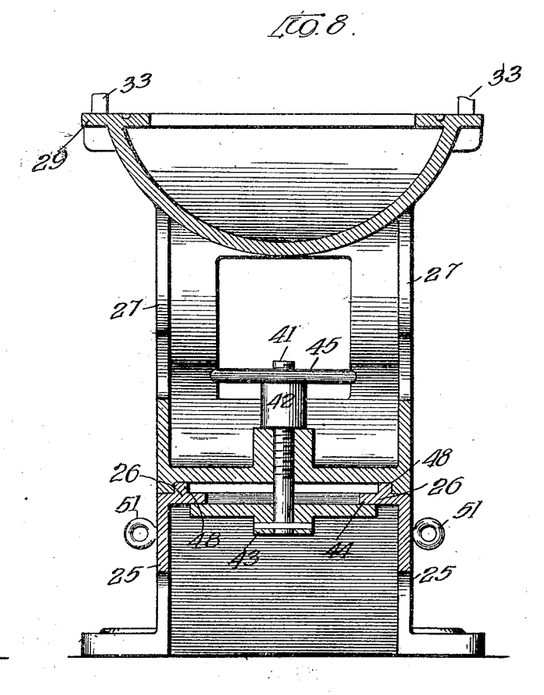
Fig. 8 is a cross section taken on line 8—8 of Fig. 2.

With certain types of engines, such, for example, as that used in Ford automobiles, it is desirable to support the engine block in an inverted position while performing the burning in operation. In Figs. 4 and 6 we have shown a suitable device for supporting the engine block in this manner, which device consists of a hollow block 46 provided with guiding flanges 47 which fit over the guiding flanges 48 of the table 26 so as to prevent any lateral displacement of the supporting block. This block is also prevented from being longitudinally displaced by means of a dowel-pin 49 which is secured in the lower flange 47 of the block and adapted to fit into a suitable counter bore in the table 26. The engine is preferably secured in inverted position on the block 46 by means of a clamping device consisting of rods 50—50 having hooks at their lower ends which engage eyelets 51—51 on opposite sides of the base 25 and provided at their upper ends with a connecting bar 52. A screw 53 is threaded into a central reinforcing boss 54 of the bar 52 and has at its lower end a swivel cap 55 adapted to engage one of the crank shaft bearings. The upper end of the screw 53 is bent at right angles to provide a handle 56.

When performing the burning in or limbering operations the crank shaft of the engine is connected to the operating mechanism supported on the base. This mechanism consists of a shaft 57 supported at one end in a bearing 58 formed in an upstanding leg 59 of the base and at the other end in a bearing 60 formed in one side wall of a casing 61 which encloses the gears for varying the speed of mechanism. A pulley 62 is revolubly mounted on the shaft 57 and is operatively connected therewith, when desired, by means of a friction clutch mechanism consisting of a hub portion 63 which is keyed to the shaft as indicated at 64 and is provided with three radial arms 65 having suitable guide ways for friction shoe elements 66. These elements are operatively connected with a collar 68 slidably mounted on the hub 63 and formed with a groove 69 into which extend the studs 70 of a fork 71. The lower end of this fork is fixed to a shaft 72 mounted on lugs 73 formed on the casing 61 and is adapted to be oscillated by means of a clutch handle 74. When it is desired to connect the belt pulley 60 with the shaft 57 the handle 74 is moved to the left (Figs. 3 and 4). This movement forces the wood clutching shoes outwardly against the inner periphery of the belt pulley so as to clutch the pulley and shaft together. For the purpose of permitting the shaft to be rotated by hand independent of the pulley 60, the radial arms 65 of the clutch are connected to a hand wheel 75. With this arrangement, the shaft may be readily rotated by hand when the clutch mechanism is disconnected from the pulley 60. The inner end of the shaft 57 is provided with a counter bore 76 which receives a stud 77 formed in the end of a shaft 78. This shaft is in linear alignment with the shaft 57 and carries at its outer end a connecting element 79 provided with studs 80 adapted to fit into the usual apertures of the crank shaft disk 81 which supports the balance wheel of a Ford engine. The shaft 78 is supported in a two part bearing 82 and is prevented from moving longitudinally by the hub of the connecting element 79 and a shoulder 83 on the shaft. When performing the limbering operation on the engine it is desirable to operate the engine at a higher rate of speed such as would be obtained by a direct connection between shafts 57 and 78. This direct connection is preferably effected by means of a gear 84, which is slidably supported on a square portion 85 of the shaft 78. This gear is provided with clutch teeth 86 adapted to engage the clutch teeth 87 on a gear 88 secured to the inner end of the shaft 57. The sliding movement of the gear 84 is effected by means of a yoke 89 which is secured to a sliding rod 90 and provided with studs 91 which extend into an annular groove 92 formed in the hub of the gear 84. The rod 90 preferably extends through the cap of the casing 61 and is operatively connected to a lever 93. When it is desired to operate the engine at a reduced rate of speed, such for example, as required when burning in the bearings of the engine, the shafts 57 and 78 are connected by means of a spool gear 94 on a shaft 95. The larger gear 96 of the spool meshes with the gear 88 and the smaller gear 97 of the spool meshes with the gear 84.

After the burning in operation has been performed the engine is removed from the machine and the balance wheel is secured to the crank shaft and, if desired, the engine may be completely assembled. The engine is then again secured to the supporting stand 27 as indicated in Fig. 3 and the connecting element 79 is operatively engaged with the balance wheel. It will be understood that when limbering the engine the balance wheel previously applied to the crank shaft requires the stand 27 of the base to be adjusted longitudinally so as to permit the connecting element 79 and the balance wheel 98 to be properly engaged. The opening 99 in the housing 38 and the recessed portion 31 of the stand 27 preferably fit over the outer surface of the two piece bearing 82 so as to permit the said stand to be readily slid into position on the table portion 26. This opening, it will be noted, is substantially closed by the bearing 82 under conditions as illustrated in Fig. 2 and by the head 79 under conditions as illustrated in Fig. 3 so as to prevent any of the oil in the recess 31 from being splashed out during the limbering operation.

Figure 9:
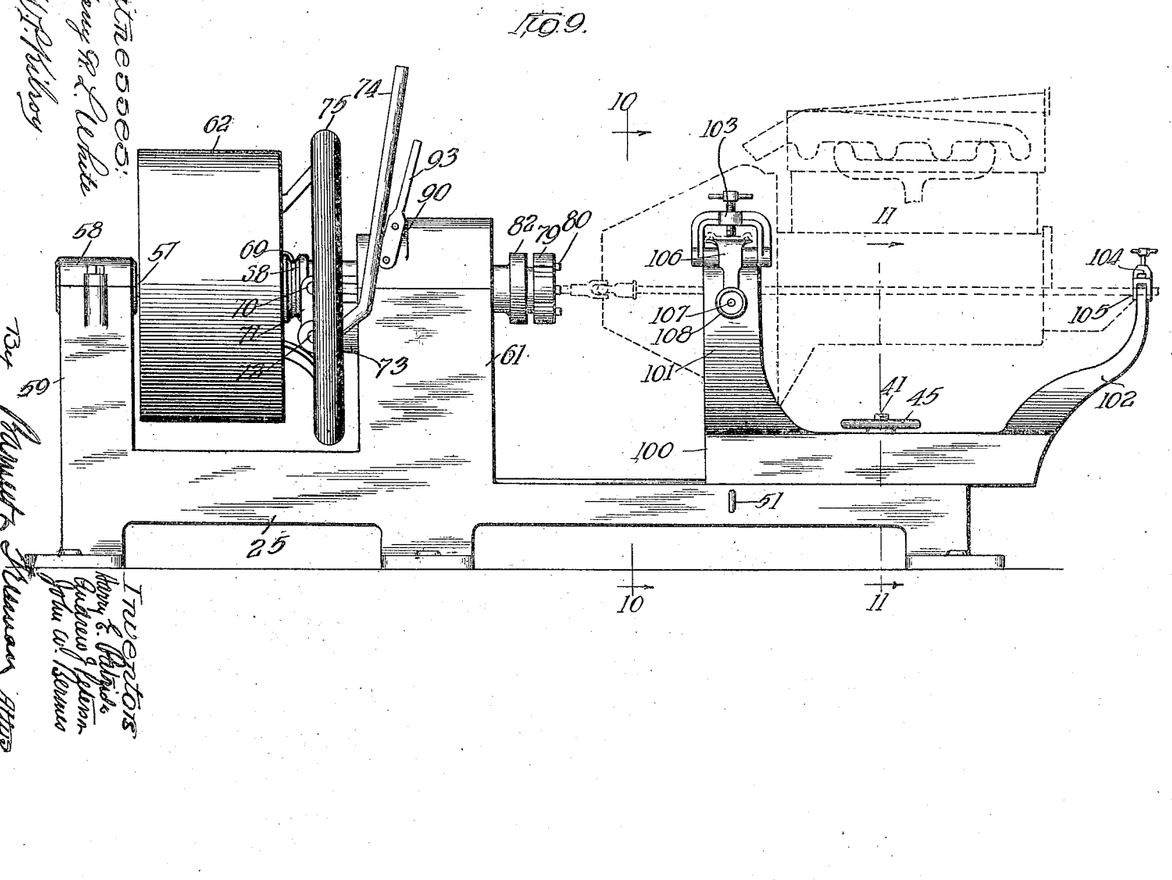
Fig. 9 is a side view in elevation of the apparatus equipped with another form of supporting stand for supporting an automobile engine in position to be subjected to the limbering operation, or if desired, be tested while operating under its own power.
Figure 10:
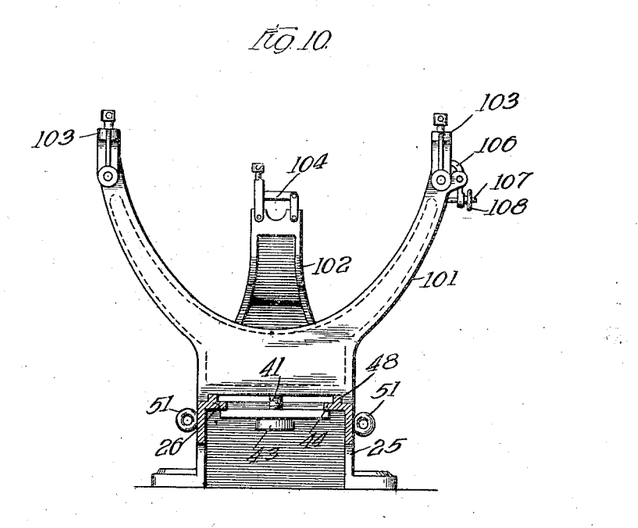
Fig. 10 is a cross section through the base and supporting stand shown in Fig 9, the view being taken on line 10—10 of this figure.
Figure 11:
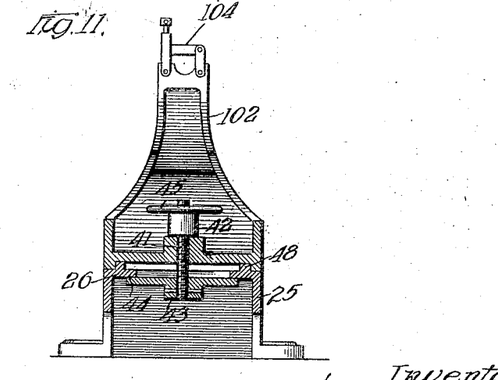
Fig. 11 is a sectional view taken on line 11—11 of Fig. 9.

For the purpose of permitting an engine, which has been entirely assembled, to be limbered up or tested, we have provided a removable supporting stand such as that shown in Fig. 9 and designated generally by the reference character 100. This stand may be secured on the table 26 of the base in substantially the same manner as the stand 27 and consists preferably of channel supporting posts 101 at opposite sides of the base adapted to receive the suspension lugs of the motor casing and with a central upright support 102 which supports one end of the casing. The engine is preferably secured in position on these posts by screw clamping devices 103 adapted to be screwed down against the suspension lugs of the engine and the clamping device 104 adapted to engage the bearing element 105 of the engine casing. The position of the engine may be adjusted in the supports 101—102 by means of a pivot element 106 the lower end of which is bifurcated and extends on opposite sides of a stud 107. 108 designates a hand nut which is threaded on the stud 107 and adapted to be screwed down against the bifurcated portion of the pivot element 106 so as to raise or lower the engine as desired.

While certain specific structures have been so described in connection with our preferred embodiment it will be obvious that certain modifications might be made without departure from our invention. We therefore do not wish to limit ourselves to the exact structure shown and described except in so far as specific limitations may appear in the appended claims.

We claim:

1. Apparatus of the character described comprising a base having a low work-supporting table with a longitudinally open top, a machine head on the base at one end of the table, a power-delivering shaft at an elevated position in said head and equipped for rotative union with the crank shaft of a motor, a holder for the latter removably mounted upon the table, and clamping means for securing the holder to the table at differing longitudinal adjustments as permitted by the aforesaid opening in the top of the table.

2. Apparatus of the character described comprising a base having a low work-supporting table, a machine head on the base at one end of the table, a power-delivering shaft at an elevated position in said head and equipped for rotative union with the crank shaft of a motor, and a holder for the latter removably mounted upon the table and having an oil sump at its upper part and clamping means below and spaced away from said sump whereby to secure it on the table.

3. Apparatus of the character described comprising a base having a low work-supporting table, a machine head on the base at one end of the table, a power-delivering shaft at an elevated position in said head and equipped for rotative union with the crank shaft of a motor, and a holder for the latter removably mounted upon the table for interchangeability with another holder that may be constructed to differently receive and hold the motor with its crank shaft in alignment with said power shaft; said removably mounted holder being adapted to hold the motor upright and having an imperforate oil sump to take the place of the crank case.

4. Apparatus of the character described comprising a base having a low work-supporting table with longitudinal top guide flanges, a machine-head on the base, at one end of the table, a power-shaft at an elevated position in said head and equipped for rotative union with the crank shaft of a motor and a holder for the latter flanged to engage the table flanges and constructed to receive and hold the motor with its crank shaft in alignment with said power shaft.

5. Apparatus of the character described comprising a base having a low work-supporting table with longitudinal top guide flanges and open center, a machine-head on the base at one end of the table, a power-shaft at an elevated position in said head and equipped for rotative union with the crank shaft of a motor, and a holder flanged to engage the table flanges and constructed to receive and hold the motor with its crank shaft in alignment with said power shaft, together with clamping means to extend through the open center of the table and engage under the same.

6. In apparatus of the character described, the combination of a base, operating mechanism on said base, removable means slidably adjustable on said base for supporting an internal combustion engine in position to be connected with said mechanism, and means for securing said removable means in its various adjusted positions.

7. In apparatus of the character described, the combination of a base, operating mechanism on said base, a removable stand adjustably secured to said base and adapted to contain a quantity of oil, means for securing a motor to said stand with the lower section of the crank case removed, and means for preventing the oil in said recess from being forced out of the same by the centrifugal action of the motor.

8. In apparatus of the character described, the combination of a base, operating mechanism on said base, a removable stand adjustably secured to said base and adapted to contain a quantity of oil, means for securing a motor to said stand with the lower section of the crank case removed, means for preventing the oil in said recess from being forced out of the same comprising a housing adapted to enclose the balance wheel of the engine and having a central opening for the connecting end of said operating mechanism, and means on the base for substantially closing said central opening.

9. Apparatus of the character described comprising a base having a work-supporting table, a machine head on the base at one end of the table, a power-delivering shaft at an elevated position in said head and equipped for rotative union with the crank shaft of a motor, and a holder for the latter removably mounted upon the table and having pivoted side rods, a cross bar to connect them, and means for clamping the cross-bar upon a motor block, the cross-bar and one of the rods having provisions for separable engagement to permit swinging apart and opening out for admission of the motor and the clamping means being applied to hold the bar and rod together.

10. Apparatus of the character described comprising a base having a work-supporting table, a machine head on the base at one end of the table, a power-delivering shaft at an elevated position in said head and equipped for rotative union with the crank shaft of a motor, and a holder for the latter removably mounted upon the table and having side uprights and an end upright equipped to receive and hold a complete motor unit with three point suspension thereof.

HARRY E. PATRICK.
ANDREW J. PETERSON.
JOHN W. BERMES.